(12) United States Patent
Croughwell, III (10) Patent No.: US 9,442,517 B2
(45) Date of Patent: Sep. 13, 2016

(54) INPUT GESTURES USING DEVICE MOVEMENT

(75) Inventor: William Joseph Croughwell, III, Hillsborough, NC (US)

(73) Assignee: BlackBerry Limited, Waterloo, Ontario (CA)

( * ) Notice: Subject to any disclaimer, the term of this patent is extended or adjusted under 35 U.S.C. 154(b) by 832 days.

(21) Appl. No.: 13/307,648

(22) Filed: Nov. 30, 2011

(65) Prior Publication Data

US 2013/0135203 A1 May 30, 2013

(51) Int. Cl.
| | | |
|---|---|---|
| G06F 3/033 | (2013.01) | |
| G06F 1/16 | (2006.01) | |
| G06F 3/0482 | (2013.01) | |
| G06F 3/0484 | (2013.01) | |

(52) U.S. Cl.
CPC ........... G06F 1/1626 (2013.01); G06F 1/1694 (2013.01); G06F 3/0482 (2013.01); G06F 3/04842 (2013.01)

(58) Field of Classification Search
CPC .................................................... G06F 3/0346
USPC ......................................................... 345/158
See application file for complete search history.

(56) References Cited

U.S. PATENT DOCUMENTS

| | | | |
|---|---|---|---|
| 5,800,221 A * | 9/1998 | Dombrowski et al. ........... 440/2 | |
| 6,567,068 B2 | 5/2003 | Rekimoto | |
| 6,690,358 B2 | 2/2004 | Kaplan | |
| 7,038,662 B2 | 5/2006 | Noguera | |
| 7,365,734 B2 | 4/2008 | Fateh et al. | |
| 2005/0243062 A1 | 11/2005 | Liberty | |
| 2006/0061545 A1 * | 3/2006 | Hughes et al. ............... 345/156 | |
| 2007/0288860 A1 * | 12/2007 | Ording et al. ................ 715/779 |
| 2008/0062001 A1 * | 3/2008 | Hsu ........................ G06F 1/1626 340/689 |
| 2008/0143675 A1 * | 6/2008 | Hsieh ..................... G06F 1/1626 345/158 |
| 2009/0097689 A1 * | 4/2009 | Prest .................... H04R 1/1091 381/380 |
| 2009/0146953 A1 * | 6/2009 | Lou ....................... G06F 3/0346 345/163 |
| 2009/0262074 A1 | 10/2009 | Nasiri et al. |
| 2010/0083154 A1 * | 4/2010 | Takeshita ..................... 715/769 |
| 2010/0103095 A1 * | 4/2010 | Yamamoto ........... G06F 3/0346 345/156 |
| 2010/0117960 A1 | 5/2010 | Huntzicker et al. |
| 2010/0161084 A1 | 6/2010 | Zhao et al. |
| 2010/0171691 A1 | 7/2010 | Cook et al. |
| 2010/0273461 A1 | 10/2010 | Choi |
| 2010/0299630 A1 * | 11/2010 | McCutchen et al. ......... 715/803 |

FOREIGN PATENT DOCUMENTS

EP 10806643 7/2007

OTHER PUBLICATIONS

Examiner's Report dated Apr. 28, 2014 for Canadian application No. 2,797,345.

(Continued)

*Primary Examiner* — Quan-Zhen Wang
*Assistant Examiner* — David Lee
(74) *Attorney, Agent, or Firm* — Jon A. Gibbons; Fleit Gibbons Gutman Bongini & Bianco P.L.

(57) ABSTRACT

A handheld electronic device has a cursor which is moved by tilting and or accelerating the device, where the cursor movement correlates to a bubble in a bull's eye level. Gestures include flicking, shaking, and reversing an acceleration or tilting, to control movement of the cursor, and to execute instructions corresponding to a position of the cursor. These gestures may be combined with touch, speech, buttons, or other known methods of communication between users and devices.

15 Claims, 9 Drawing Sheets

(56) References Cited

OTHER PUBLICATIONS

EESR dated May 18, 2012 for European Application No. 1191419.8.

Unknown, "Screenshot of labyrinth application", https://web.archive.org/web/20090117172916/http://labyrinth.codify.se/features.html, from Dec. 3, 2007, pp. 1.

* cited by examiner

INPUT GESTURES USING DEVICE MOVEMENT

FIELD OF THE DISCLOSURE

The present disclosure relates to input gestures on a handheld electronic device using sensors responsive to acceleration or orientation of the device.

BACKGROUND

Handheld electronic devices often times include components which signal a change in position of the device relative to the ground. This change of orientation is often used by software executing on the device.

The miniaturization of handheld electronic devices is a challenge. This challenge is especially difficult when miniaturizing user interface devices such as keyboards. When keyboards become too small, they become difficult to use, especially to users with large hands or the elderly often with limited finger dexterity.

BRIEF DESCRIPTION OF THE DRAWINGS

The accompanying figures, where like reference numerals refer to identical or functionally similar elements throughout the separate views, and which together with the detailed description below are incorporated in and form part of the specification, serve to further illustrate various examples and to explain various principles and advantages all in accordance with the present disclosure, in which.

DETAILED DESCRIPTION

As required, detailed embodiments are disclosed herein; however, it is to be understood that the disclosed embodiments are merely examples and that the systems and methods described below can be embodied in various forms. Therefore, specific structural and functional details disclosed herein are not to be interpreted as limiting, but merely as a basis for the claims and as a representative basis for teaching one skilled in the art to variously employ the present subject matter in virtually any appropriately detailed structure and function. Further, the terms and phrases used herein are not intended to be limiting, but rather, to provide an understandable description of the concepts.

The terms "a" or "an", as used herein, are defined as one or more than one. The term plurality, as used herein, is defined as two or more than two. The term another, as used herein, is defined as at least a second or more. The terms "including" and "having," as used herein, are defined as comprising (i.e., open language). The term "coupled," as used herein, is defined as "connected," although not necessarily directly, and not necessarily mechanically.

As used herein, a "gesture" is defined as accelerating, repositioning, tilting, shaking, or otherwise moving the handheld electronic device to cause a change of a position of a cursor, as opposed to motions made on a touch screen using a hand, finger, stylus or other object.

A "bull's eye level" is a type of level that allows for leveling of planes in two directions. Like a tubular level, a bubble in a liquid medium is free to move about within an enclosed container. However, unlike a tubular level which permits leveling in only one direction, in the bull's eye level, the bubble is free to move along both an x and y direction of a given plane. The bubble, having less density than the surrounding liquid medium rises to the top of the liquid surface. The behavior of the bull's eye level is emulated in a handheld electronic device, using sensors to determine the orientation of the device relative to the earth's gravity. For example, tilting the handheld electronic device changes a location of the normalized surface of the simulated liquid, and accordingly, a cursor moves in a direction to the top of the simulated liquid surface.

"Orientation" is used to describe a position of the electronic handheld device relative to the earth's gravity. A change in the orientation of the device changes the cursor or position indicator which is programmed to model a bubble in a bull's eye level. In various examples, a device orientation is able to be changed by tilting the device by, for example, rotating the device about one or more physical axes.

The term "indicator" is a cursor or other positioning reference and in one example is programmed to model a bubble in a bull's eye level based on the origination of the electronic handheld device.

A "graphical object" is any text, picture, or combination capable of being displayed on a handheld electronic device. The graphical object comes into "contact" with the indicator when the images overlap or come within a predefined distance of each other. This distance may be settable by a user.

Axis of rotation in these examples can be any axes of rotation of the handheld device including a principle axis of rotation along an x, y, or z axis. A longitudinal axis (x), or roll axis, is an axis drawn from the right side of the handheld electronic device to the left of the handheld electronic device parallel to the display. A lateral axis, or pitch axis (y), is an axis running from the top to bottom side of the handheld electronic device parallel to the display. A vertical axis (z), or yaw axis, an axis drawn from top to bottom perpendicular to the ground and to the display of the handheld electronic device, if the handheld electronic device were held parallel to the ground (e.g., laying flat on a surface). These principle axes of rotation are shown in FIG. 1.

The term "x-y planar" means movement along a plane typically co-planar to the display of a handheld electronic device.

Figure 1:
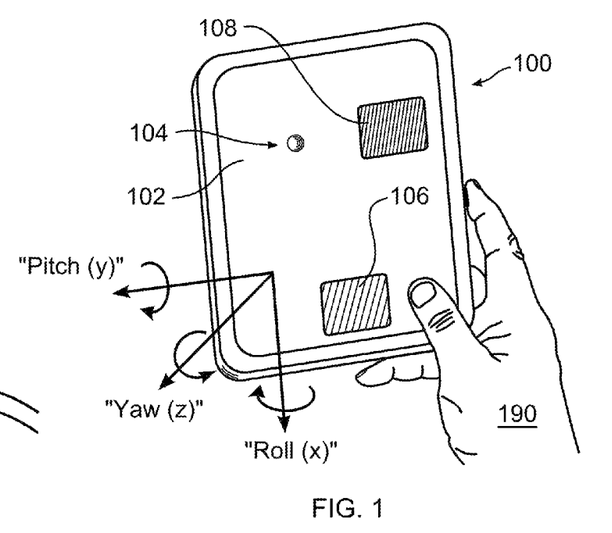
FIGS. 1-3 illustrates an example longitudinal or roll axis tilting gesture with a handheld electronic device.
Figure 2:
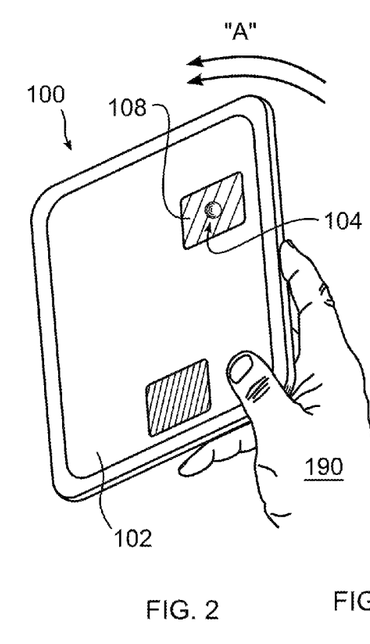
Figure 3:
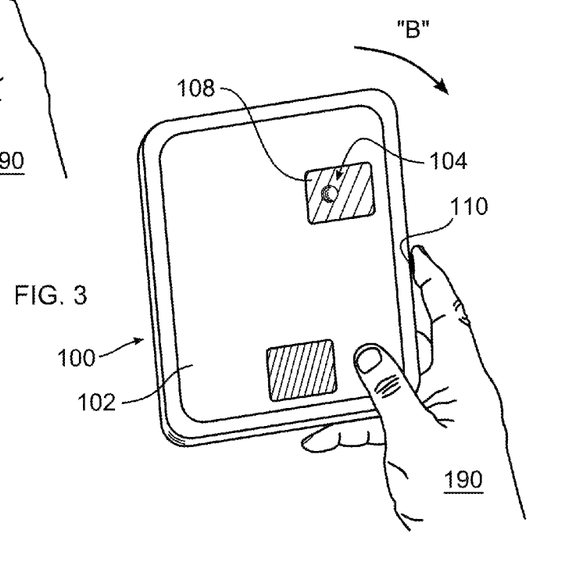

With reference to FIGS. 1-3, a handheld electronic device 100 is shown having a display 102 upon which an indicator, such as cursor 104, may be depicted.

While the handheld electronic device 100 is depicted as a tablet computer, it is important to note that other forms of handheld electronic devices may be used including wireless phones, handheld computers; ebook readers; portable computers; and laptop computers; or any other handheld electronic device which requires or utilizes human input in the form of gestures. The handheld electronic device includes a display 102, for example an LCD screen. The handheld electronic device is sufficiently light to be held by a single hand of a user 190.

Display 102 displays information and indicia as determined by software executing upon one or more processors as further described below associated with display 102. For illustrative purposes, example activatable display regions, or activation zones 106, 108 are depicted upon display 102. To enable activation zone 108, cursor 104 is moved to a position overlapping activation zone 108 at least in part. Cursor 104 is moved by increasing an elevation of an edge where it is desired to position cursor 104, relative to a current location of cursor 104. This movement is accomplished by tilting handheld electronic device 100. Using software executing with a processor within handheld electronic device 100, cursor 104 is moved based upon a simulation of various aspects of physics, whereby cursor 104 forms a virtual floating bubble having movements which are similar, at least in part, to a real world floating bubble. More particularly, by imitating behavior of a real world bubble, a user 190 of handheld electronic device 100, who is naturally familiar with the behavior of bubbles in liquid, anticipates how cursor 104 moves as handheld electronic device 100 is tilted. Accordingly, user 190 readily learns and quickly masters this aspect of cursor movement in the use of handheld electronic device 100.

While activation zone 108 is illustrated as changing an appearance, it should be understood that any action that may be associated with a selected item can be used. For example, if cursor 104 moves from a first column heading to a second column heading, the latter represented by activation zone 108, a table associated with the columns could be sorted in accordance with the second column heading. In another example, information could be sent to another destination, for example an SMS address, or a printer.

In another example, displayed information may change orientation in accordance with tilting, or in accordance with any other gesture described herein. Cursor 104 may or may not move together with the displayed information. For example, a map, graphic, or image may move or change orientation or perspective, as a gesture is executed with handheld electronic device 100, for example tilting. This action may be combined with other gestures, as described herein.

Movement of handheld electronic device 100, including the sensing of acceleration or a change in orientation or angular disposition of handheld electronic device 100 relative to the earth is sensed by a sensor further described below.

Herein, a resting or starting angular disposition, or a normal orientation of device 100, is defined to indicate a starting orientation. This starting orientation typically represents a comfortable orientation for both viewing and manipulating the handheld electronic device 100 by a user.

A normal orientation may represent an orientation or angular disposition of any angle, including an orientation that is flat, perpendicular, or at a fixed angle relative to gravitational forces. A normal orientation is periodically recalculated, to accommodate a shift in user position, or passing of the handheld electronic device 100 to a different user. An average normal orientation may be calculated by an observing angle of the handheld electronic device 100 over an amount of time. For example, the normal or resting orientation is determined by averaging multiple orientation samples during either a brief or extended time interval prior to initiating movement of cursor 104, or by selecting an actuator such as a button. A simulated liquid upper level is normalized relative to the established normal orientation. In an example, software executing within handheld electronic device 100 enables user 190 to establish a normal orientation, accessible through a menu or displayed configuration interface, or through a dedicated physical button or hardware control of a calibration menu (not shown).

Establishing a normal orientation calibrates handheld electronic device 100 for a baseline from which subsequent moves are carried out. Calibration may also be performed using an option or menu on the display, where moving the indicator to a predefined region of the display is carried out, independent of an orientation of the handheld electronic device, and a current orientation of the handheld electronic device as defined as being level within the current orientation.

The indicator or cursor 104 acts as a bull's eye level on a portion of the display, when the handheld electronic device is held parallel in to a given plane. Moving the indicator, or cursor 104, across the display 102 is carried out in response to a change in orientation of the handheld electronic device. As detailed further herein, a graphical object presented on the display is selected in response to the indicator coming into contact with the graphical object, and an actuator being activated. In one example, the given plane is setup during a calibration. This enables the user to setup and define a specific plane for the x axis and y axis rotation. In general, the given plane is related to a plane formed by the handheld electronic device when it is in a normal orientation.

The indicator or cursor simulating the action of a bubble in a liquid mimics a bull's eye level. The roll (x) tilting of the handheld electronic device 100 in FIGS. 1-3 changes a location of the normalized surface of the simulated liquid, and accordingly, cursor 104 simulating the bubble in the bull's eye level, correspondingly moves in the display 102. This movement and new location of the cursor 104 is shown in FIG. 2, where handheld electronic device 100 is tilted so that a left side of the handheld electronic device 100, as viewed, is lowered relative to a normal orientation of handheld electronic device 100. Accordingly, cursor 104 moves right, in a direction of activation zone 108. Arrows "A" indicate a direction of tilting or rotation of handheld electronic device 100, to cause cursor 104 to move right. In FIG. 2, activation zone 108 has visibly changed, providing user feedback, in response to an overlapping of cursor 104.

To cause cursor 104 to move towards a top of display 102, as viewed, the top of display 102 would be raised relative to a normal orientation of handheld electronic device 100 and gravitational forces. A similar analogy is used to move cursor 104 towards any location which is raised relative to a normal orientation.

In one example, cursor 104 simulates movement of the bubble in the bull's eye level as if the inside surface of the display 102 was not flat. In this example, the cursor 104 simulates the air bubble in a bull's eye level with a convex or concave surface of the display 102 to produce a non-linear movement across the display 102.

When handheld electronic device 100 is held horizontal in both a length (y) and a width (x) axis, such that an axis normal to the screen (z) is vertical, the cursor 104 that simulates movement of the bubble in the bull's eye level moves to the middle of the display 102. If handheld electronic device 100 is rotated such that the top of display 102 is raised, and the bottom of display 102 is lowered (i.e. rotated about the x axis), the cursor 104 would move toward the top of display 102. If handheld electronic device 100 is rotated such that the left side of handheld electronic device 100 is raised and the right side is lowered (i.e. rotated about the y axis), the cursor 104 would move toward the left side of display 102. Likewise, the cursor 104 would move toward the right if the right side is raised above the left side. The rotational angle of handheld electronic device 100 in x, y, z space determines how far cursor 104 moves away from a middle of the display. Compound rotations cause cursor 104 to move into a quadrant (e.g., either upper left, upper right, lower left or lower right), a distance in both the left right and top bottom axes proportional to the respective rotations in those directions. Simultaneously rotating handheld electronic device 100 about x and z axes would cause the same effect as rotating it about the x and y axes since, in both cases, the plane of the screen would change such that one corner would be raised above the others and the corner opposite would be lowered below the other corners.

Movement of cursor 104 may be terminated in a variety of ways, including a combination of methods. In one example, and with reference to FIG. 3, handheld electronic device 100 has been tilted back to a normal viewing angle, shown by arrow "B", indicating to software associated with handheld electronic device 100 that movement of cursor 104 should be stopped. In another example, user 190 tilts handheld electronic device 100 in a direction opposite the direction of tilting causing cursor movement, but to a lesser extent and for a shorter duration, thereby indicating to software that cursor movement should be stopped or slowed. The extent of tilting and duration is a predetermined threshold, which may be set, for example, by the user. Alternatively, the threshold may be preset based on characteristics of the handheld electronic device 100. Subsequent tilting motions may then be employed to once again cause movement and adjustment of a position of cursor 104. Referring to FIGS. 2 and 3, a single arrow "B" is illustrated, relative to the double arrow "A", to indicate the extent of tilting for arrow "B" may be less than an extent or rate of tilting for arrow "A", in order to terminate movement.

In a further example, cursor 104 movement does not begin until handheld electronic device 100 is triggered or enabled for cursor 104 movement, for example by tilting handheld electronic device 100 at a rotational angle that is changed relative to a normal angle. More particularly, a change from a normal angle, along any axis, of more than a particular minimum rotational angle, triggers initiation of cursor 104 movement. Once cursor 104 movement begins, handheld electronic device 100 may then be tilted to or rotated to an angle which would cause cursor 104 movement to imitate the rate and direction of the bubble in the bull's eye level.

In yet another example, movement of cursor 104 is triggered by pressing a physical button. The physical button 110 is disposed on the exterior of handheld electronic device 100. Another example is pressing a "soft" button such as an icon on display 102 or executing a cursor click upon display 102. Other commands, including voice commands to handheld electronic device 100, may be used as well. Alternatively, cursor 104 movement may be initiated or terminated by shaking the handheld electronic device 100, discussed further below.

In a further example, movement of cursor 104 may be terminated by rotating or tilting handheld electronic device 100 to an orientation past a normal orientation in a direction opposite to, or away from, the direction of cursor movement. Alternatively, movement of handheld electronic device 100 in a shaking motion in a z axis perpendicular to the geometric plane of the display 102 may initiate or terminate the cursor 104 movement. The viscosity of the simulated liquid, resulting in a corresponding behavior of cursor 104, is determined, for example, by user's settings in the software. As an example, the response rate of the cursor 104 may be adjustable by the user, to simulate a lower viscosity for faster cursor 104 movement, or a higher viscosity for slower cursor 104 movement.

As determinable by software, a specific action or mode may be executed as a result of cursor 104, moving to a location that overlaps the activation zone 108. Alternatively, a position of cursor 104 over activation zone 108 may only prime or enable further action, which is executed in a subsequent step. For example, a physical button associated with handheld electronic device 100, for example button 110, may be pressed to indicate that an action associated with activation zone 108 should be carried out.

While cursor 104 has the form of a bubble in a liquid in the illustrations, it should be understood that cursor 104 may have any appearance, for example a pointer, cross-hairs, or any known cursor shape, and may have either a two or three dimensional appearance, while operating in a manner similar to that described above.

In addition to moving cursor 104 through rotating, tilting, flicking, shaking, dragging, or any other method mentioned herein, cursor 104 may additionally be moved, and objects selected, through the use of a trackpad, trackball, optical navigation mouse, joystick, touchscreen, or any other human interface device or combination thereof.

Prior or subsequent to intentionally moving cursor 104, it may be desired to avoid responding to an undesired move of the handheld electronic device 100. Accordingly, cursor 104 or other displayed object may not be caused to move by a gesturing motion until a gesturing mode or state is entered. A determination of a gesturing state may be based on a selected activity or pending operation of the handheld electronic device 100. Alternatively, user 190 may place the handheld electronic device 100 into a gesturing mode through a direct signal, such as a screen tap or other fingertip gesture, a rotation or tilting of the handheld electronic device 100, a press of button 110 or some other button, a sequence of movements of device 100, or speech, for example. Once a gesturing mode has been determined, cursor 104 may be moved.

Acceleration of cursor 104 corresponds to an acceleration of handheld electronic device 100. The correlation may be direct, proportional in magnitude, or related in accordance with a mathematical formula, for example an extent of rotation or tilting. Similarly, movement of cursor 104 may correlate with a magnitude of acceleration of handheld electronic device 100. A combination of acceleration and orientation, and/or a rate of each attribute, for example a speed and/or extent of tilting during acceleration, may produce a unique result relative to either acceleration or orientation alone. One advantageous result is controlling a rate of cursor 104 movement during a tilting gesture.

Figure 4:
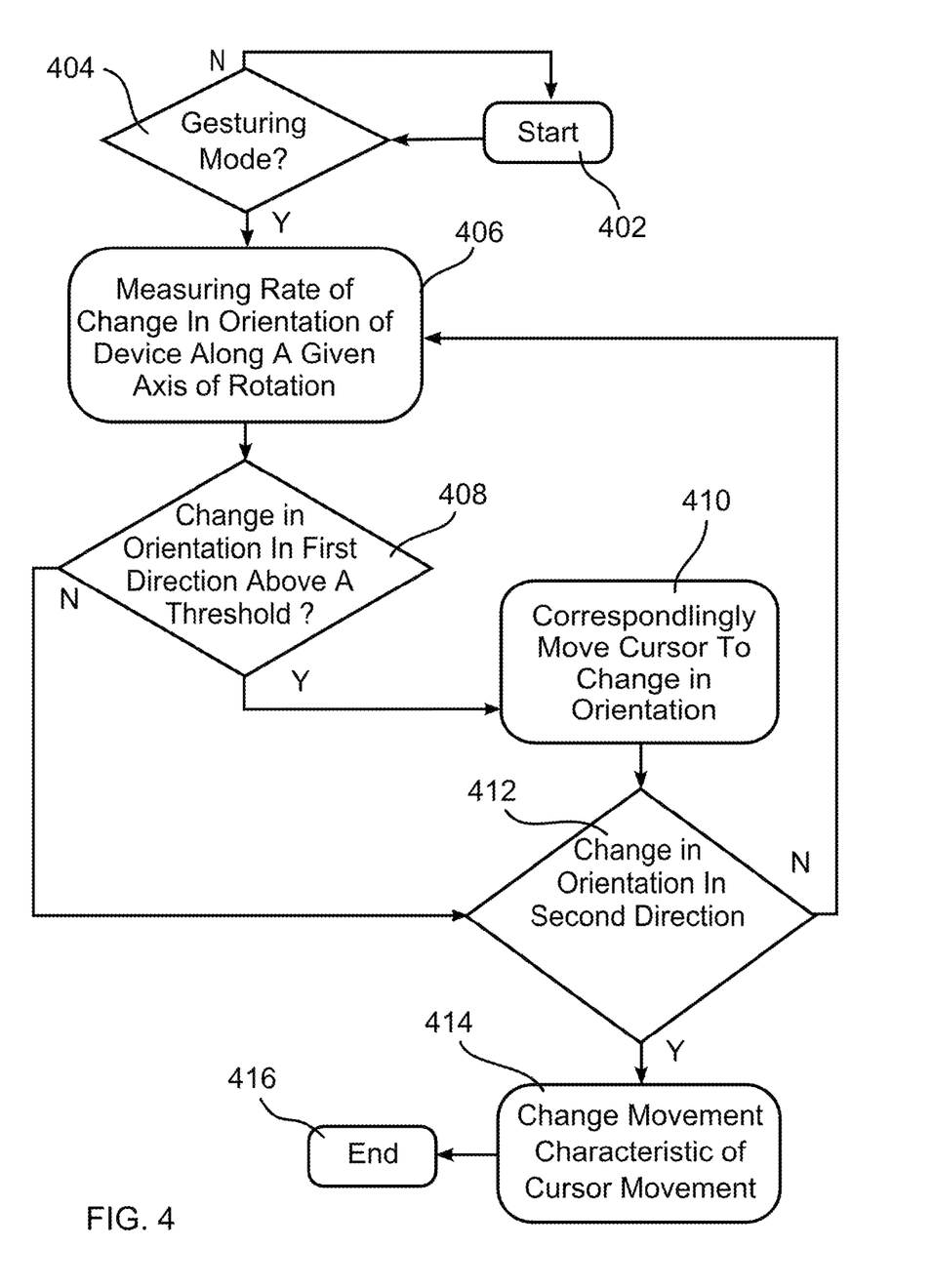
FIG. 4 is a flow diagram processing a gesture with different rates of change in orientation around an axis of rotation of a handheld electronic device as shown in FIGS. 1-3.

FIG. 4 is a flow diagram processing gesture with different rates of change in orientation around an axis of rotation by a handheld electronic device. The process starts in step 402 and immediately determines if a gesturing mode in step 404 has been entered. Once the gesturing mode in step 404 has been entered, the process continues to measure a rate of change in orientation of the handheld electronic device along a given axis of rotation, which may include or be based upon a principle axes of rotation: roll (x), pitch (y) and/or yaw (z) in step 406. When the change in the first direction, i.e. the given direction, is above a predetermined threshold in step 408, the process continues to step 410. In this example, the threshold is settable by the user. In response to the change in orientation being above a first threshold, the cursor is moved to correspond to the change in orientation in step 410. In response to the change in orientation being below the threshold in step 408, the process continues to step 412. In step 412, a determination is made if the change in orientation. In one example, a second threshold may be used with the second change in orientation in step 412. This second threshold may be the same threshold as step 408 or another threshold which may also be settable by the user. Using a second threshold in step 412 would ensure a slow leveling or slow change of direction causes a slowing or reversal of direction of the indicator. In another example, when the change in orientation in a second direction is above a threshold such as an exaggerated reverse flick, the indicator would suddenly stop.

In response to the change in orientation being below the second threshold in step 414, the movement characteristic of the cursor is changed and the process ends in step 416. A movement characteristic of the cursor includes, but is not limited to, stopping the cursor, slowing the cursor movement as described above, accelerating the cursor movement, or adjusting the cursor to move in a step-wise fashion rather than in a continuous fashion in response to the orientation of the handheld electronic device. Otherwise, in the event the change in direction in the second direction is above the given threshold in step 412, the process loops back to step 406. Measuring the rate in change of orientation of the handheld electronic device 100 around a given axis of rotation and a subsequent rate change in an opposite direction around the same axis of rotation provides cursor control to be halted in the gesturing mode. The cursor control in the gesturing mode may be started again as described above to select an object or perform other actions.

Figure 5:
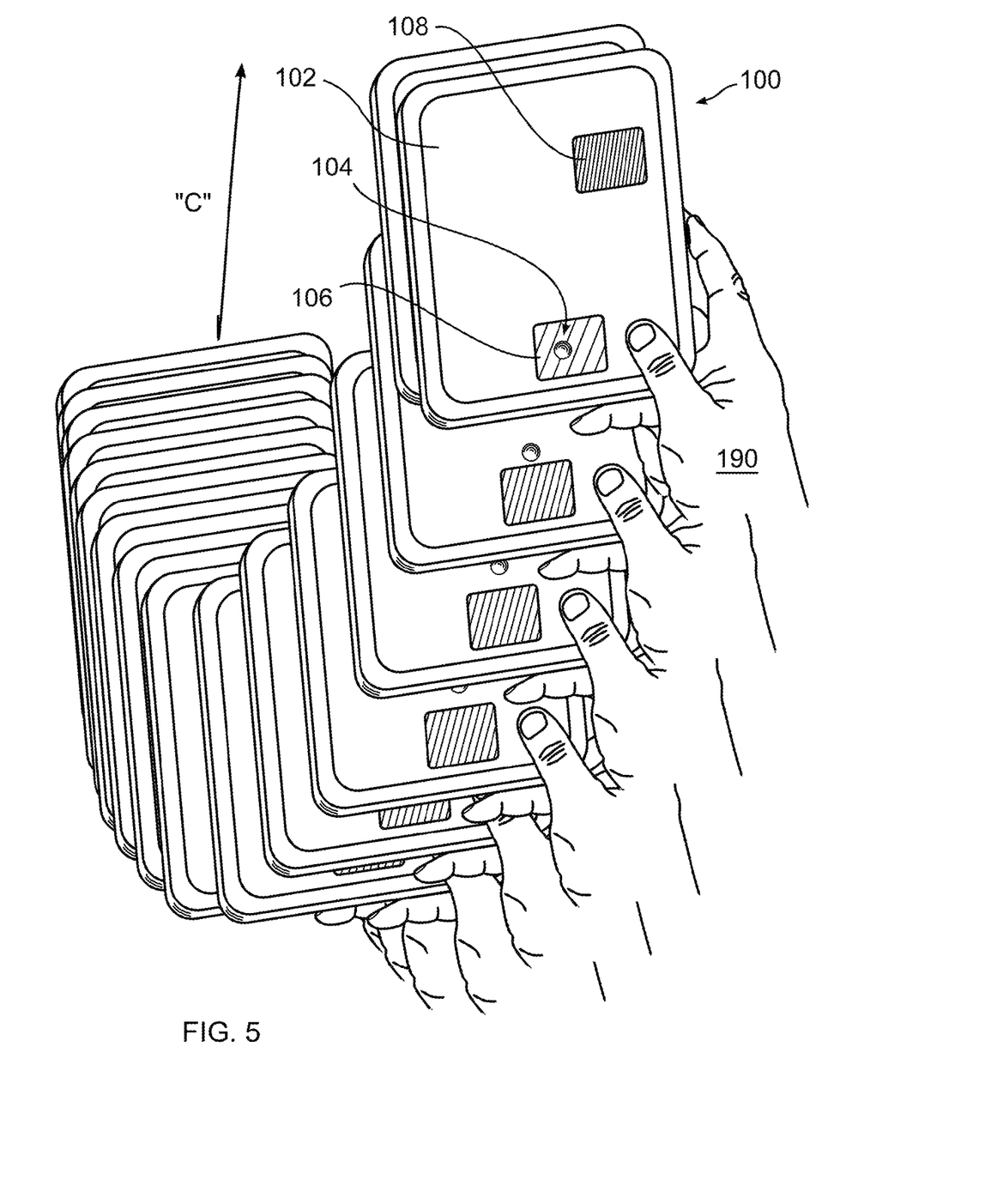
FIG. 5 illustrates an example x-y planar flicking gesture with a handheld electronic device.

With reference to FIG. 5, an x-y planar gesture of a rapid or accelerated movement of cursor 104 may be implemented by performing a "flick" of handheld electronic device 100. FIG. 5 is a series of still images, or snapshots, illustrated to represent a disposition of handheld electronic device 100 at time intervals as the handheld electronic device 100 moves along the path defined by the series of images in the general direction of arrow "C." The precise timing of movement, and a disposition of handheld electronic device 100 beyond a two dimensional plane, are not critical to carrying out this aspect of the disclosure. However, the timing of movement may be utilized to further control cursor 104 movement. In particular, the flick is implemented by moving handheld electronic device 100 in a first direction to a first extent, and then moving handheld electronic device 100 in a substantially different or opposite direction to a second greater extent, corresponding to a desired distance of travel or movement for cursor 104. Software executing on the handheld electronic device 100 interprets that a flick is occurring due to the aforementioned unique characteristics of movement.

Movement in the first, opposite direction, may be slight, and brief, in order to be distinguishable from a lengthy subsequent movement. This avoids an interpretation of the first movement as a desired movement of cursor 104. Alternatively, if the first movement is interpreted as a desired movement of cursor 104, the movement will be relatively insubstantial and will not significantly counteract movement in the intended direction. A subsequent rate of change in a second direction representing an extent and reduction of speed of movement in the second direction determines a distance and speed of travel of cursor 104, and is representative of the bubble in a bull's eye level, or a floating object, in a viscous liquid. A precise extent and speed of movement may not, and need not be known to an inexperienced user, as some movement in an intended direction is likely, and practice will eventually improve an estimation of results.

As may further be seen in FIG. 5, a slight reverse direction of movement of handheld electronic device 100 may be seen in the last, or topmost image. This reversed movement terminates or retards cursor 104 movement in accordance with a method described above, although other methods may be used, as described herein.

In an example, movement of cursor 104 may be achieved by measuring a rate of change in the orientation of the handheld electronic device in a first direction around a given x-y planar direction or axis of rotation. In response to the rate of change in orientation being above a given threshold, moving the indicator across the display in association with the rate of change in orientation that has been measured in a given direction. Otherwise, in response to the rate of change in orientation being below a given threshold in a second x-y planar direction or rotation around the given axis, which is substantially opposite the first direction, halting movement of the indicator.

In FIG. 5, the topmost image indicates that cursor 104 is positioned over activation zone 106, which has changed appearance (relative to the appearance of activation zone 106 in FIGS. 1-3) to indicate activation zone 106 is selected or enabled, or alternatively, that an action associated with activation zone 106 has been carried out.

Figure 6:
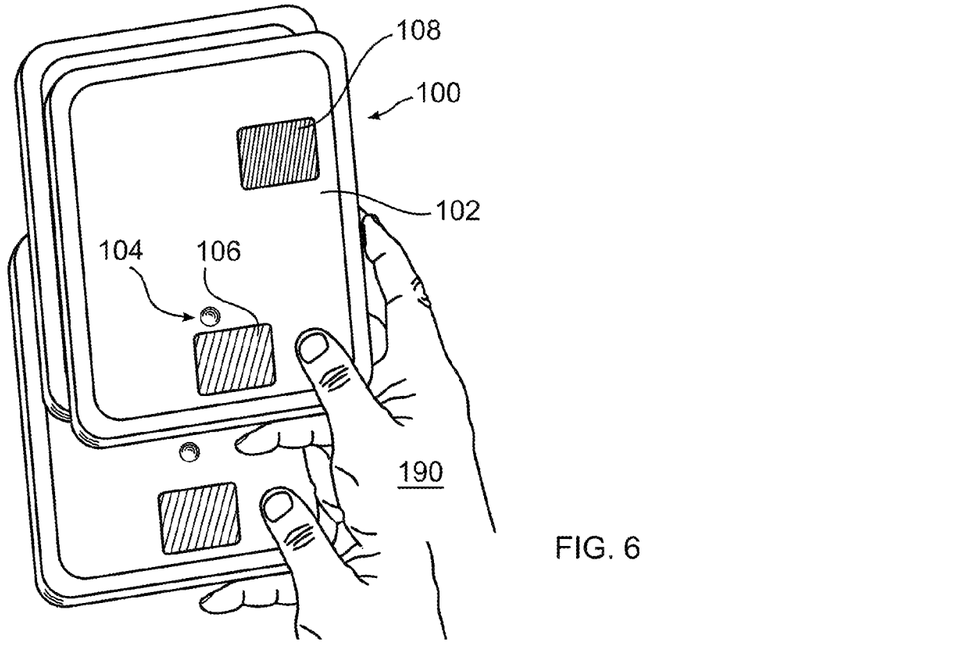
FIG. 6 illustrates a portion of the x-y planar gesture of FIG. 5, including a terminating gesture with a handheld electronic device.
Figure 7:
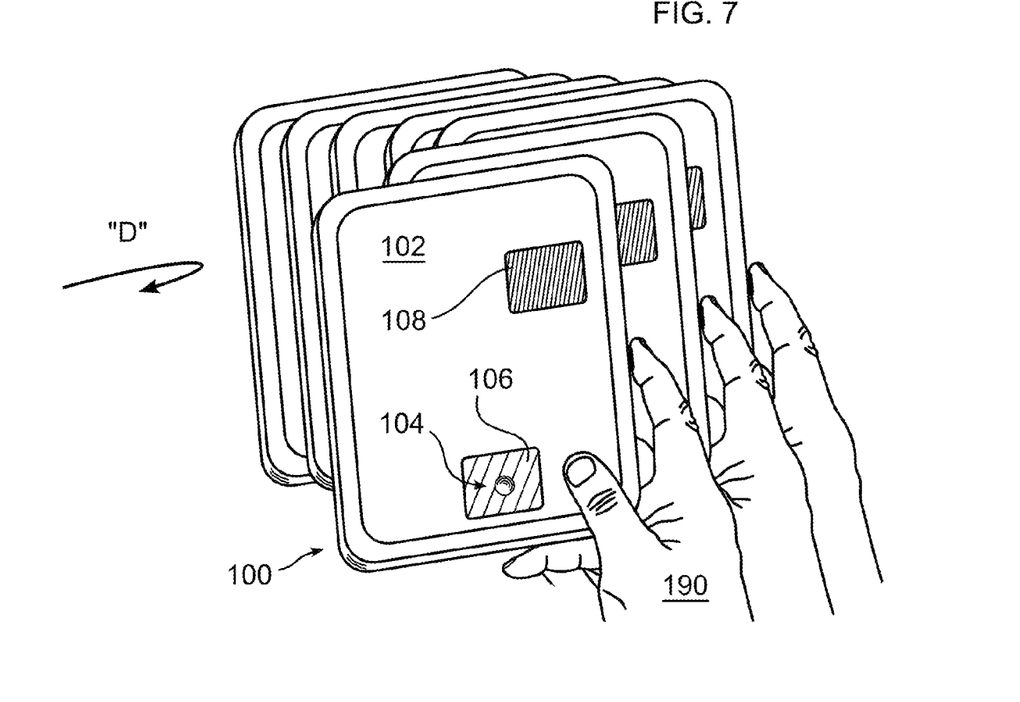
FIG. 7 illustrates an executing x-y planar gesture with a handheld electronic device.

Referring now to FIG. 6, the last few images of the x-y planar gesture sequence of FIG. 5 is illustrated, but activation zone 106 is not yet triggered. In FIG. 7, activation zone 106 is triggered after the cursor is positioned within activation zone 106 by a subsequent movement in the x-y plane parallel to the display 102 of the handheld electronic device 100. In this example, the quick or sharp movement in either an x-y plane parallel to the display 102 or axial rotation illustrated in FIG. 6 indicates that movement of cursor 104 is not intended, as might be indicated by a gradual movement in the x-y plane or rotating around an axis.

A quick, sudden, or sharp movement may alternatively be used after a cursor move to indicate that an execution of an indicated command is desired. Alternatively, as may further be seen in FIG. 7, an x-y planar movement may be followed by another x-y planar movement in an opposite direction, as indicated by the planar arrow "D".

In a further example, shown in FIG. 7, a complete back and forth motion or shake, may be used to further distinguish a gesture for terminating movement of cursor 104. In yet another example, the shake may be repeated a specific number of times, either to terminate cursor movement, or to indicate a further action, for example to represent a click of an item over which cursor 104 lies or hovers. For example, a first shake may indicate termination of cursor 104 movement, and a second shake indicates a press or activation of the item over which cursor 104 hovers.

Figure 8:
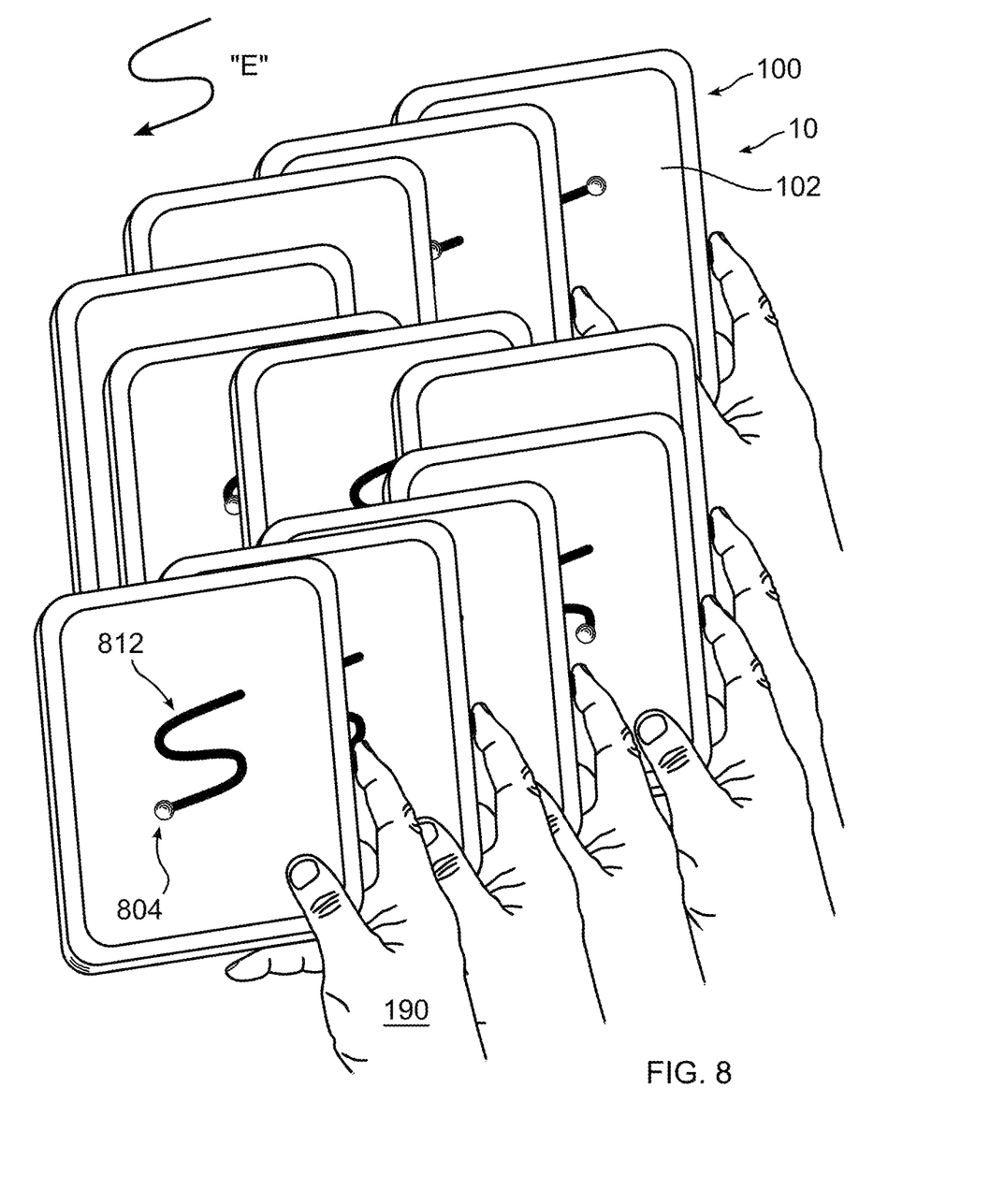
FIG. 8 illustrates creating a drawing using x-y planar gestures with a handheld electronic device.

In another example, gestures may be used to create drawing or illustrating using handheld electronic device 100. As may be seen in FIG. 8, handheld electronic device 100 is moved in an example pattern 812 along an x-y plane parallel to the display 102, as shown by arrow "E" with cursor 804 in the final position. In this example, a drawing tool is selected using any known method, and drawing may be initiated and terminated by any of the examples described herein, including for example shaking, a physical button press associated with handheld electronic device 100, tilting, a sudden acceleration, a slow movement of handheld electronic device 100, or any other method. While a planar or non-tilting movement of handheld electronic device 100 is illustrated in FIG. 8, it should be understood that movement of cursor 804 may be carried out by tilting, as described with respect to, for example, FIGS. 1-3.

Figures 9, 10:
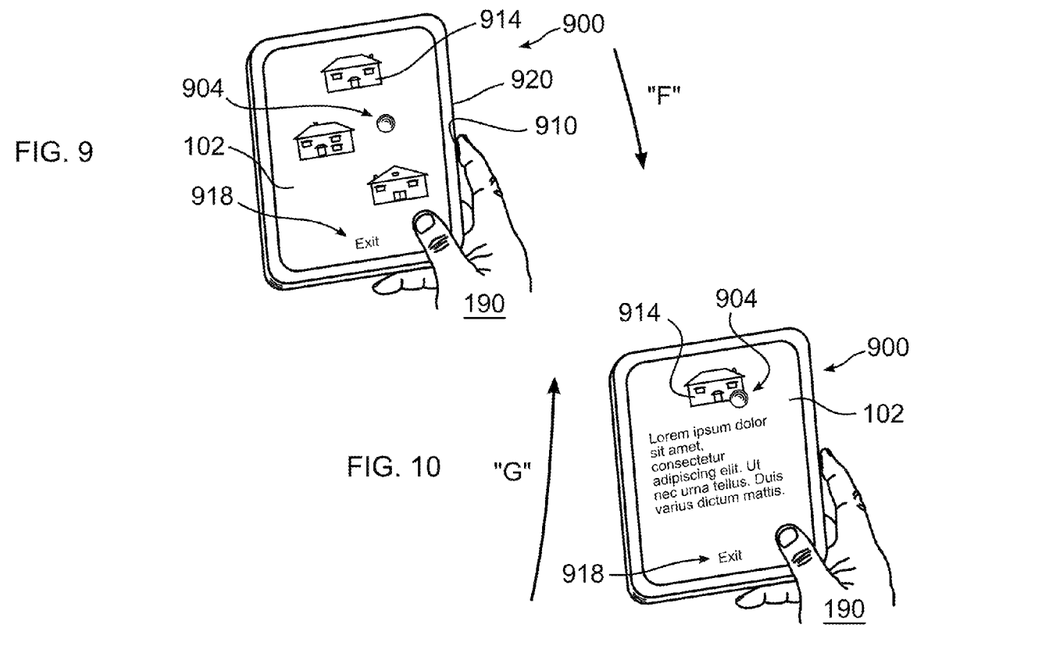
FIGS. 9-11 illustrate example gestures for selecting objects, and executing instructions using a button with a handheld electronic device.
Figure 11:
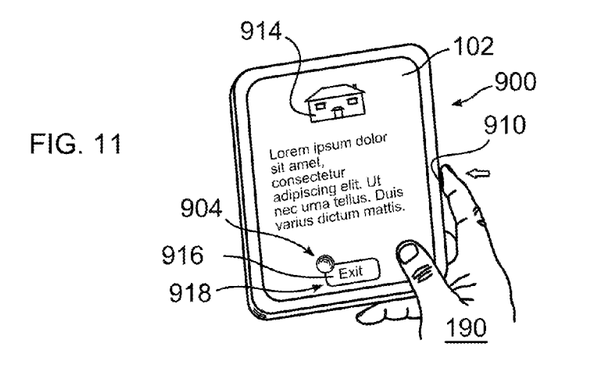

FIGS. 9-11 illustrate an example of a combination of gestures. In particular, in FIG. 9, user 990 is presented with several objects of potential interest, including object 914 of particular interest. User 990 may use any of the methods described herein for moving cursor 904 from a current position, to a position overlapping object 914 as shown. In FIG. 9, a flicking method along a direction indicated by arrow "F" is used to move cursor 904. In FIG. 10, any method discussed herein may be used to terminate cursor movement, including applying the correct amount of flick motion to position the cursor over object 914. Once overlapped by cursor 904, object 914 is configured by software to automatically present additional related information, indicated symbolically by the "Lorem ipsum . . . " text, without any further required steps. A subsequent flick, indicated by arrow "G", positions cursor 104 to overlap an activation zone 918 bearing "Exit" indicia 916, whereupon indicia 916 may be highlighted as shown in FIG. 11. Once highlighted, a subsequent push of button 910, indicated by an arrow in FIG. 11, carries out a sequence of software steps associated with "Exit" indicia 916, for example returning to the displayed output of FIG. 9. Alternatively, a shaking gesture may be used to indicate a desire to execute the activities associated with an activation zone, including the activation zone associated with the "Exit" indicia 916 of FIGS. 9-11.

In the illustrations, button 910 is illustrated as projecting from a side surface of housing 920 of handheld electronic device 900, positioned to be readily engaged by a finger of a single hand which is holding and supporting handheld electronic device 900. It should be understood, however, that depending on the dimensions of handheld electronic device 900, button 910 may be positioned elsewhere upon handheld electronic device 900, including another side surface, the back or front of handheld electronic device 900, and is pressed by any digit, or a palm, of the hand, or any other part of the body of user 190. In one example, button 910 is located so as to be able to be pressed by the same hand that is holding handheld electronic device 900, so that another hand may be engaged in other tasks that may be unrelated to the use of handheld electronic device 900.

It should further be understood that FIGS. 9-11 are illustrative of one combination of gestures that are operative to carry out the illustrated activities, and that other combinations of gestures as described herein may be used, including, for example, moving cursor 904 by tilting handheld electronic device 900, as described with respect to FIGS. 1-3.

Figures 12, 13, 14, 15:
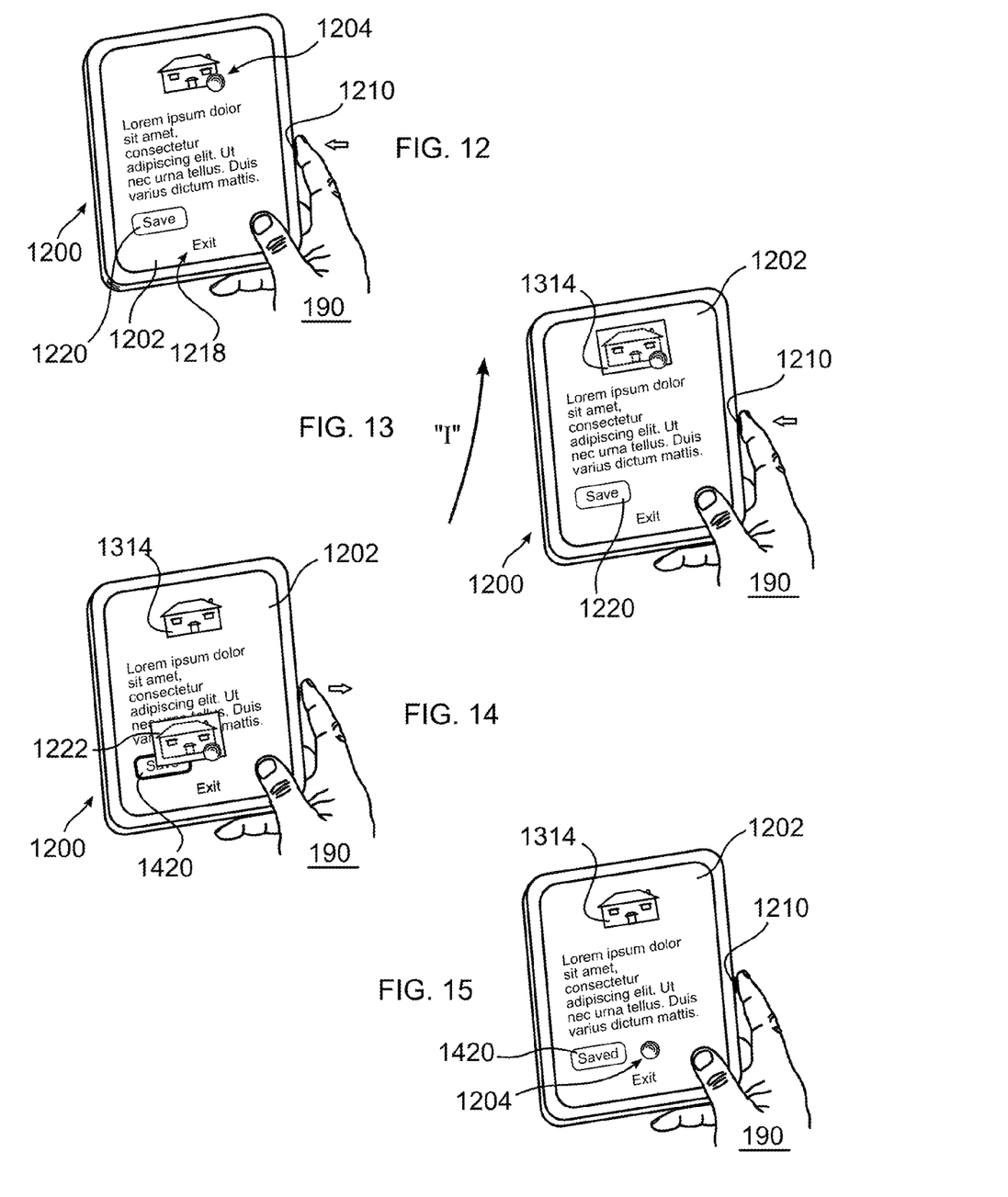
FIGS. 12-15 illustrate example gestures using a physical button combined with other gestures with a handheld electronic device.

In FIGS. 12-15, a flick gesture is combined with a press of a physical button 1210 to carry out a single handed gesture. More particularly, in FIG. 12, cursor 1204 has been positioned over an object of interest using any of the methods described herein. Button 1210 is depressed by a finger of user 190, as indicated by an outlined arrow adjacent button 1210 and a finger of user 190. In FIG. 13, while maintaining a pressed state of button 1210, a flick or tilt gesture is performed in a direction as indicated by arrow "I", for example. In this example, pressing button 1210 associates subsequent movement gestures of handheld electronic device 1200 with object 1314, which lies within an activation zone programmed for this association. In FIG. 14, representation 1222 has been moved by the aforedescribed gesture to a position overlying at least a portion of activation zone 1420. In this example activation zone 1420 is defined for saving information associated with object 1314. A subsequent release of button 1210, as indicated by an outlined arrow, terminates any currently executing movement gestures, and "drops" representation 1314 onto activation zone 1420, and/or otherwise causes actions associated with activation zone 1420 to be carried out. In FIG. 15, indicia associated with activation zone 1420 indicates the intended action has been carried out.

An extent of tilting, flicking, or any other gesture, may be adjusted to produce a desired level of commensurate movement of displayed elements. This sensitivity adjustment may be made for a particular handheld electronic device using hardware or software associated with the handheld electronic device. Alternatively, the adjustment may be accessible to a user of the handheld electronic device, whereby the user may execute software which enables an adjustment of the sensitivity for tilting, flicking, shaking, or any other gesture described herein. Similarly, sensitivity need not be uniform throughout movement of a displayed element. An initial or terminating movement may have a higher or lower sensitivity or extent of movement than during an intermediate portion of a movement for a given extent of movement of handheld electronic device 1200.

In one example, cursor 1204 is unresponsive or less responsive to quick or sudden movements, and more responsive to slow movements. In this manner, user 190 makes a series of rapid tilts or flicks in one direction, alternating with slow returns to an original position, thereby moving cursor 1204 in steps, for example one step for each combination of rapid and slow movements.

Figure 16:
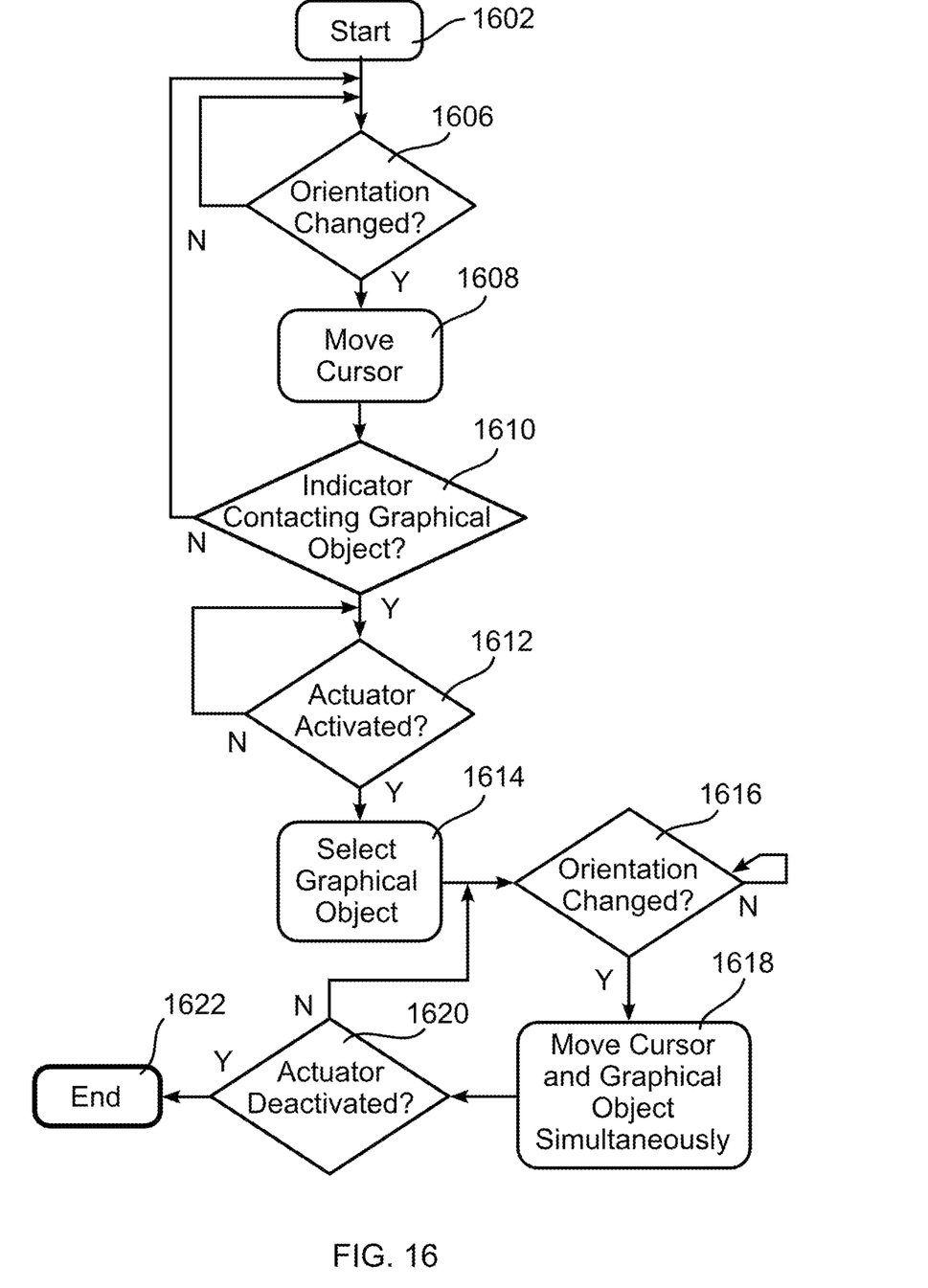
FIG. 16 is a flow diagram processing a gesture for selecting a graphical object and moving it by tilting across a display of a handheld electronic device as shown in FIGS. 12-15.

FIG. 16 is a flow diagram illustrating a method of processing a gesture for selecting and moving a graphical object by tilting across a display of a handheld electronic device. The process starts in step 1602 and immediately determines if a gesturing mode in step 1604 has been entered. Once the gesturing mode in step 1604 has been entered, the process continues to determine if a change in orientation in step 1606 has occurred. Once the change in orientation or location has been sensed, the indicator is moved, in step 1608. Another test is made to determine if the indicator is in contact with a graphical object in step 1610. The term "contact" is used to mean overlay or the indicator being within a graphical boundary defined by the graphical object on the display. If it is not determined that the indicator is in contact with the graphical object, the process returns to determining, at 1602, if there is a change in orientation. If, in the event the actuator is activated in step 1612, the object is selected and the process ends in step 1616.

If it is determined that the indicator is in contact with a graphical object, the process continues by determining, at 1612, if an actuator is activated. In one example, the process continues performing this determination until an actuator is activated. In the case of determining that an actuator is activated, the graphical object is selected, at 1614. Once the graphical object is selected, the process continues by determining, at 1616, a change in orientation of the handheld electronic device. In one example, this determination is performed until a change in orientation is identified. Once a change in orientation is determined, the process moves, at 1618, the cursor and graphical object simultaneously. In one example, this movement is in response to the determined change in orientation.

The process then determines, at 1620, if the actuator is deactivated. If the actuator is not deactivated, the process returns to determining, at 1616, a change of orientation of the handheld electronic device. If it is determined that the actuator is deactivated, the process ends in step 1622.

Figure 17:
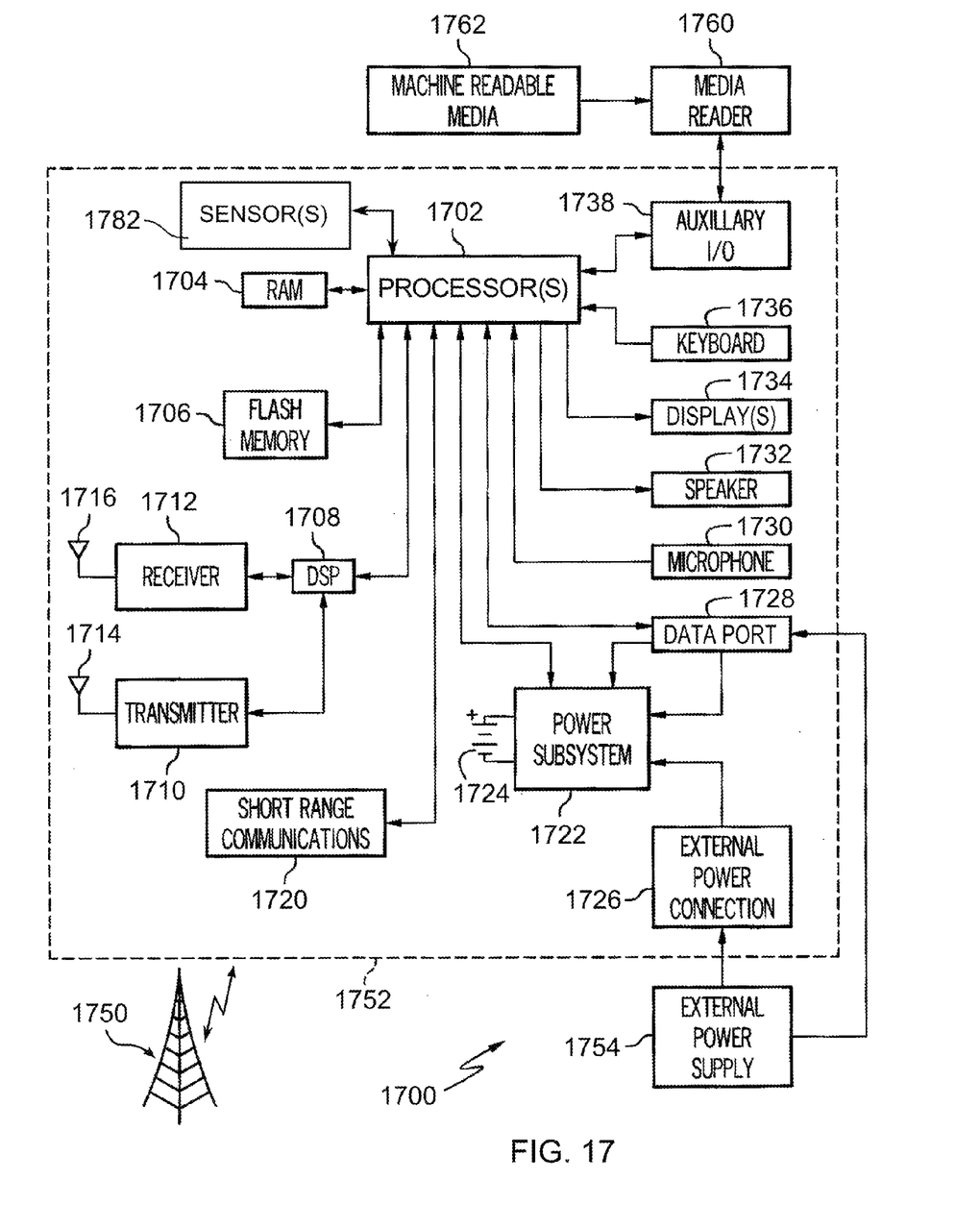
FIG. 17 is a block diagram of an example handheld electronic device.

Turning now to FIG. 17, shown is a block diagram of a handheld electronic device and associated components 1700. In this example, a handheld electronic device 1700 is a wireless two-way communication device with voice and data communication capabilities. Such electronic devices communicate with a wireless voice or data network 1750 using a suitable wireless communications protocol. Wireless voice communications are performed using either an analog or digital wireless communication channel. Data communications allow the electronic device 1700 to communicate with other computer systems via the Internet. Examples of electronic devices that are able to incorporate the above described systems and methods include, for example, a data messaging device, a two-way pager, a cellular telephone with data messaging capabilities, a wireless Internet appliance or a data communication device that may or may not include telephony capabilities.

The illustrated handheld electronic device 1700 is an example handheld electronic device that includes two-way wireless communications functions. Such handheld electronic devices incorporate communication subsystem elements such as a wireless transmitter 1710, a wireless receiver 1712, and associated components such as one or more antenna elements 1714 and 1716. A digital signal processor (DSP) 1708 performs processing to extract data from received wireless signals and to generate signals to be transmitted. The particular design of the communication subsystem is dependent upon the communication network and associated wireless communications protocols with which the device is intended to operate.

The handheld electronic device 1700 includes a microprocessor 1702 that controls the overall operation of the handheld electronic device 1752. The microprocessor 1702 interacts with the above described communications subsystem elements and also interacts with other device subsystems such as non-volatile or flash memory 1706, random access memory (RAM) 1704, auxiliary input/output (I/O) device 1738, data port 1728, display 1734, keyboard 1736, speaker 1732, microphone 1730, a short-range communications subsystem 1720, a power subsystem 1722, and or any other device subsystems.

One or more sensors 1782 are incorporated into or coupled with handheld electronic device. The sensor 1782 is operative to sense such movement by any sensing device currently known and understood within the relevant art, or hereinafter invented. Examples of sensor 1782 include one or more accelerometers, G-force meter, gravimeter, gradiometer, inclinometer, clinometer, tiltmeter, micro electromechanical system (MEMS), compass, or the like, using any known technology, including liquid capacitive, piezoelectric, piezoresistive, piezoceramic, or other technology currently known and understood within the relevant art, or hereinafter invented. Such devices or technology enable the conversion of movement information to an electric signal that is interpreted by microprocessor 1702.

Pairs or triplet combinations, or bi-axial or tri-axial implementations of sensor 1782 may used for detecting movement in two or three dimensions. Sampling rates of sensor 1782 are selected to balance cost and other factors, with a requirement for the perception of responsiveness and smooth movement desired for a user. One or more accelerometers may provide information regarding a rate of speed or acceleration of a handheld electronic device, and may also provide information pertaining to orientation of the handheld electronic device 1700, as well. Algorithms or software which may be executed by microprocessor 1702, for converting spatial, coordinate, or other reference information embedded within such electric signal, to an angular orientation of the sensing device and/or an orientation of a device into which the sensing device is connected or associated, is understood by one skilled in the relevant art.

A battery 1724 is connected to a power subsystem 1722 to provide power to the circuits of the handheld electronic device 1752. The power subsystem 1722 includes power distribution circuitry for providing power to the handheld electronic device 1700 and also contains battery charging circuitry to manage recharging the battery 1724. The power subsystem 1722 includes a battery monitoring circuit that is operable to provide a status of one or more battery status indicators, such as remaining capacity, temperature, voltage, electrical current consumption, and the like, to various components of the electronic handheld 1700.

The data port 1728 is able to support data communications between the electronic handheld device 1700 and other devices through various modes of data communications, such as high speed data transfers over optical communications circuits or over electrical data communications circuits such as a USB connection incorporated into the data port 1728 of some examples. Data port 1728 is able to support communications with, for example, an external computer or other device.

Data communication through data port 1728 enables a user to set preferences through the external device or through a software application and extends the capabilities of the device by enabling information or software exchange through direct connections between the electronic handheld device 1752 and external data sources rather then via a wireless data communication network. In addition to data communication, the data port 1728 provides power to the power subsystem 1722 to charge the battery 1724 or to supply power to the electronic circuits, such as microprocessor 1702, of the electronic handheld device 1700.

Operating system software used by the microprocessor 1702 is stored in flash memory 1706. Further examples are able to use a battery backed-up RAM or other non-volatile storage data elements to store operating systems, other executable programs, or both. The operating system software, device application software, or parts thereof, are able to be temporarily loaded into volatile data storage such as RAM 1704. Data received via wireless communication signals or through wired communications are also able to be stored to RAM 1704.

The microprocessor 1702, in addition to its operating system functions, is able to execute software applications on the handheld electronic device 1700. A predetermined set of applications that control basic device operations, including at least data and voice communication applications, is able to be installed on the handheld electronic device 1700 during manufacture. Examples of applications that are able to be loaded onto the device may be a personal information manager (PIM) application having the ability to organize and manage data items relating to the device user, such as, but not limited to, e-mail, calendar events, voice mails, appointments, and task items.

Further applications may also be loaded onto the handheld electronic device 1700 through, for example, the wireless network 1750, an auxiliary I/O device 1738, data port 1728, short-range communications subsystem 1720, or any combination of these interfaces. Such applications are then able to be installed by a user in the RAM 1704 or a non-volatile store for execution by the microprocessor 1702.

In a data communication mode, a received signal such as a text message or web page download is processed by the communication subsystem, including wireless receiver 1712 and wireless transmitter 1710, and communicated data is provided the microprocessor 1702, which is able to further process the received data for output to the display 1734, or alternatively, to an auxiliary I/O device 1738 or the data port 1728. A user of the handheld electronic device 1752 may also compose data items, such as e-mail messages, using the keyboard 1736, which is able to include a complete alphanumeric keyboard or a telephone-type keypad, in conjunction with the display 1734 and possibly an auxiliary I/O device 1738. Such composed items are then able to be transmitted over a communication network through the communication subsystem.

For voice communications, overall operation of the handheld electronic device 1700 is substantially similar, except that received signals are generally provided to a speaker 1732 and signals for transmission are generally produced by a microphone 1730. Alternative voice or audio I/O subsystems, such as a voice message recording subsystem, may also be implemented on the handheld electronic device 1700. Although voice or audio signal output is generally accomplished primarily through the speaker 1732, the display 1734 may also be used to provide an indication of the identity of a calling party, the duration of a voice call, or other voice call related information, for example.

Depending on conditions or statuses of the electronic handheld device 1700, one or more particular functions associated with a subsystem circuit may be disabled, or an entire subsystem circuit may be disabled. For example, if the battery temperature is low, then voice functions may be disabled, but data communications, such as e-mail, may still be enabled over the communication subsystem.

A short-range communications subsystem 1720 provides for data communication between the handheld electronic device 1752 and different systems or devices, which need not necessarily be similar devices. For example, the short-range communications subsystem 1720 includes an infrared device and associated circuits and components or a Radio Frequency based communication module such as one supporting Bluetooth® communications, to provide for communication with similarly-enabled systems and devices, including the data file transfer communications described above.

A media reader 1760 is able to be connected to an auxiliary I/O device 1738 to allow, for example, loading computer readable program code of a computer program product into the handheld electronic device 1700 for storage into non-volatile memory such as flash memory 1706. One example of a media reader 1760 is an optical drive such as a CD/DVD drive, which may be used to store data to and read data from a computer readable medium or storage product such as computer readable storage media 1762. Examples of suitable computer readable storage media include optical storage media such as a CD or DVD, magnetic media, or any other suitable data storage device. Media reader 1760 is alternatively able to be connected to the electronic device through the data port 1728 or computer readable program code is alternatively able to be provided to the handheld electronic device 1700 through the wireless network 1750.

Although specific examples of the subject matter have been disclosed, those having ordinary skill in the art will understand that changes can be made to the specific examples without departing from the spirit and scope of the disclosed subject matter. The scope of the disclosure is not to be restricted, therefore, to the specific examples, and it is intended that the appended claims cover any and all such applications, modifications, and examples within the scope of the present disclosure.

The invention claimed is:

1. A method of processing an input gesture, comprising:
   displaying a cursor upon a display of a handheld electronic device;
   moving the cursor across the display in response to a change in orientation of the handheld electronic device relative to a first plane defined by the handheld electronic device;
   determining if the cursor is in a position at least partially overlapping with a graphical object presented on the display;
   selecting the graphical object in response to an activation of an actuator, when the cursor is determined to be in a position at least partially overlapping with the graphical object; and
   moving the cursor and graphical object together simultaneously in response to a further change in orientation of the handheld electronic device;
   calculating a rate of movement of the cursor, when moving the cursor, to correspond to a rate of a change in orientation of the device in a first direction; and
   calculating slowing the rate of movement of the cursor to correspond to a rate of change in orientation of the device in a second direction, different than the first direction.

2. The method of claim 1, wherein the change in orientation is a change in orientation around at least one axis of rotation of the handheld electronic device.

3. The method of claim 1, wherein movement of the cursor is further based upon a change in position of the handheld electronic device in an x-y plane that is co-planar to the display, the movement sensed by a sensor.

4. The method of claim 1, further comprising:
   displaying a calibration menu;
   moving the cursor to a predefined region of the display independent of a current orientation of the handheld electronic device; and
   defining a current plane of the handheld electronic device as the first plane.

5. The method of claim 4, wherein the current plane is defined as being the first plane in response to activation of an actuator.

6. The method of claim 1, wherein movement of the cursor is caused only after the rate of change in orientation is above a first given threshold.

7. The method of claim 1, further including determining that a gesturing mode has been initiated by detecting a first movement along a first plane in a first direction to a first extent followed directly by a second movement in a direction opposite from the first direction and to a second extent substantially greater than the first extent.

8. A handheld electronic device for processing an input gesture corresponding to a cursor movement operation, comprising:

a display;

a sensor operative to sense a change in orientation of the handheld electronic device; and a processor communicatively coupled to the display, an actuator, and the sensor, the processor operative in a first mode to display a cursor upon the display, determine that a tilting mode is enabled by detecting tilting of the device about an axis of rotation of the device using input from the sensor;

in response to determining that the tilting mode is enabled, move the cursor across the display in response to further tilting of the handheld electronic device;

determine if the cursor is in a position at least partially overlapping with a graphical object presented on the display, select the graphical object in response to an activation of the actuator when the cursor is in a position at least partially overlapping with the graphical object presented on the display; and move the cursor and graphical object simultaneously in response to a further tilting of the handheld electronic device;

calculate a rate of movement of the cursor, when moving the cursor, to correspond to a rate of a change in orientation of the device in a first direction; and calculate slowing the rate of movement of the cursor to correspond to a rate of change in orientation of the device in a second direction, different than the first direction.

9. The handheld electronic device of claim 8, wherein the processor is further operative, in a second mode, to define a first plane by presenting a calibration menu on the display, moving the cursor to a predefined region of the display independent of a current orientation of the device, and defining a current plane of the device as the first plane.

10. The handheld electronic device of claim 9, further comprising an actuator communicatively coupled with the processor, wherein the current orientation is defined as defining the current plane in response to an actuator being activated.

11. The handheld electronic device of claim 8, wherein a current plane is defined as being a first plane in response to an amount of time in which the device is in substantially in the current plane.

12. The handheld electronic device of claim 8, wherein the processor is further operative to measure a rate of change in the orientation of the handheld electronic device in a first direction around a given axis of rotation;

in response to the rate of change in orientation being above a given threshold, move the cursor across the display based upon the rate of change in orientation that has been measured in the first direction around the given axis of rotation; and in response to the rate of change in orientation being below a given threshold in a second direction around the given axis of rotation, wherein the second direction is substantially opposite the first direction, halting movement of the cursor.

13. The device of claim 8, wherein determining that a cursor mode is enabled by detecting tilting of the device about an axis of rotation of the device includes detecting tilting of the device corresponding to at least one of a predetermined rate of tilting and a predetermined extent of tilting.

14. A handheld electronic device for processing an input gesture corresponding to a cursor drag operation, comprising:

a display;

a sensor operative to sense a change in orientation of the handheld electronic device; and a processor communicatively coupled to the display, an actuator and the sensor, the processor operative, in a first mode, to display a cursor upon the display, move the cursor across the display in response to the change in orientation of the device relative to a first plane defined by the handheld electronic device, determine if the cursor is in a position at least partially overlapping with a graphical object presented on the display, determine that a drag mode is enabled by detecting tilting of the device about an axis of rotation of the device;

in response to determining that the drag mode is enabled, select the graphical object, move the cursor and graphical object simultaneously, in response to a further change in orientation of the handheld electronic device, to overlay at least a portion of an activation zone of the display;

calculate a rate of movement of the cursor, when moving the cursor, to correspond to a rate of a change in orientation of the device in a first direction; and calculate slowing the rate of movement of the cursor to correspond to a rate of change in orientation of the device in a second direction, different than the first direction.

15. The device of claim 14, wherein determining that a drag mode is enabled by detecting tilting of the device about an axis of rotation of the device includes detecting tilting of the device corresponding to at least one of a predetermined rate of tilting and a predetermined extent of tilting.

* * * * *